Patented July 21, 1925.

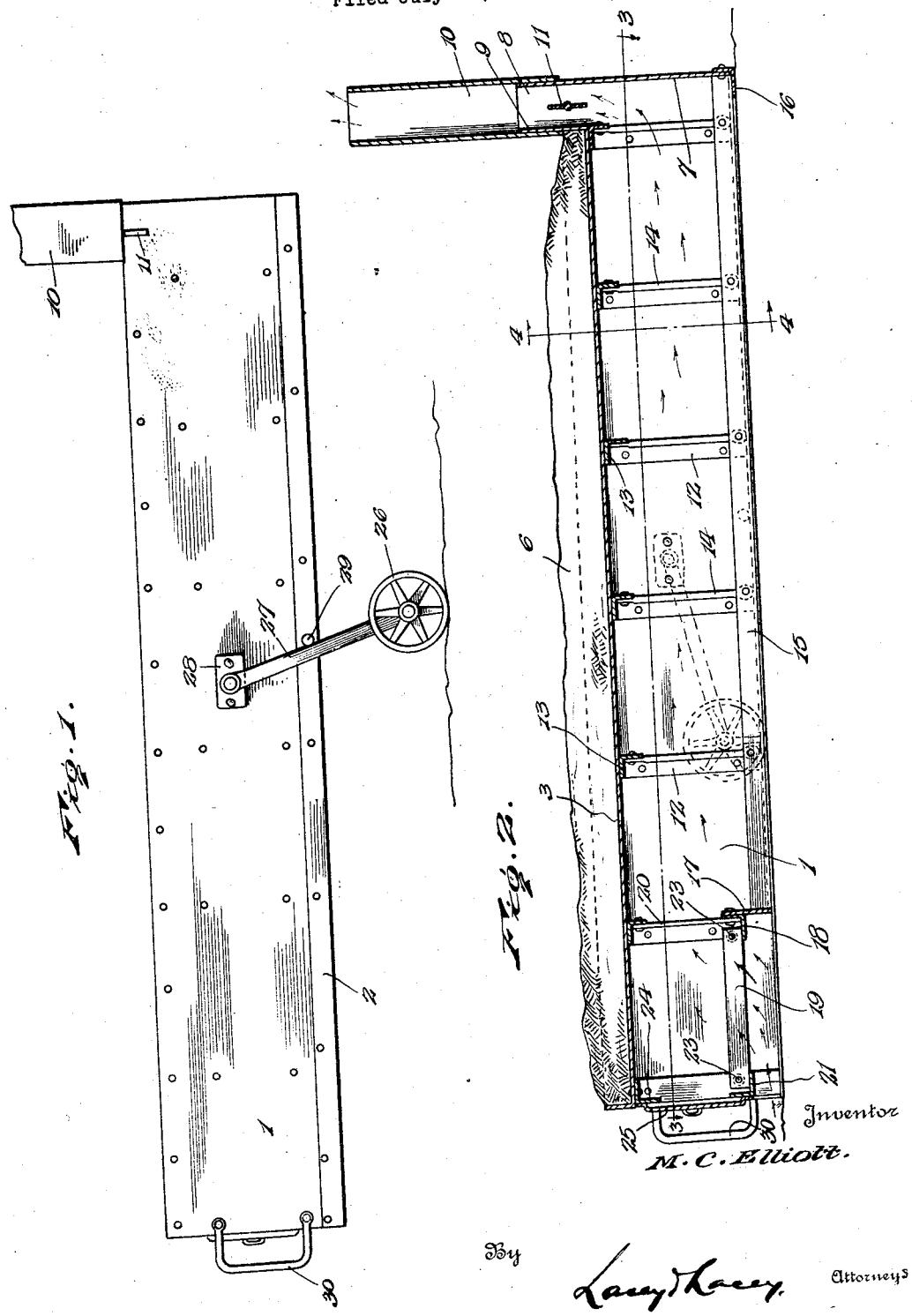

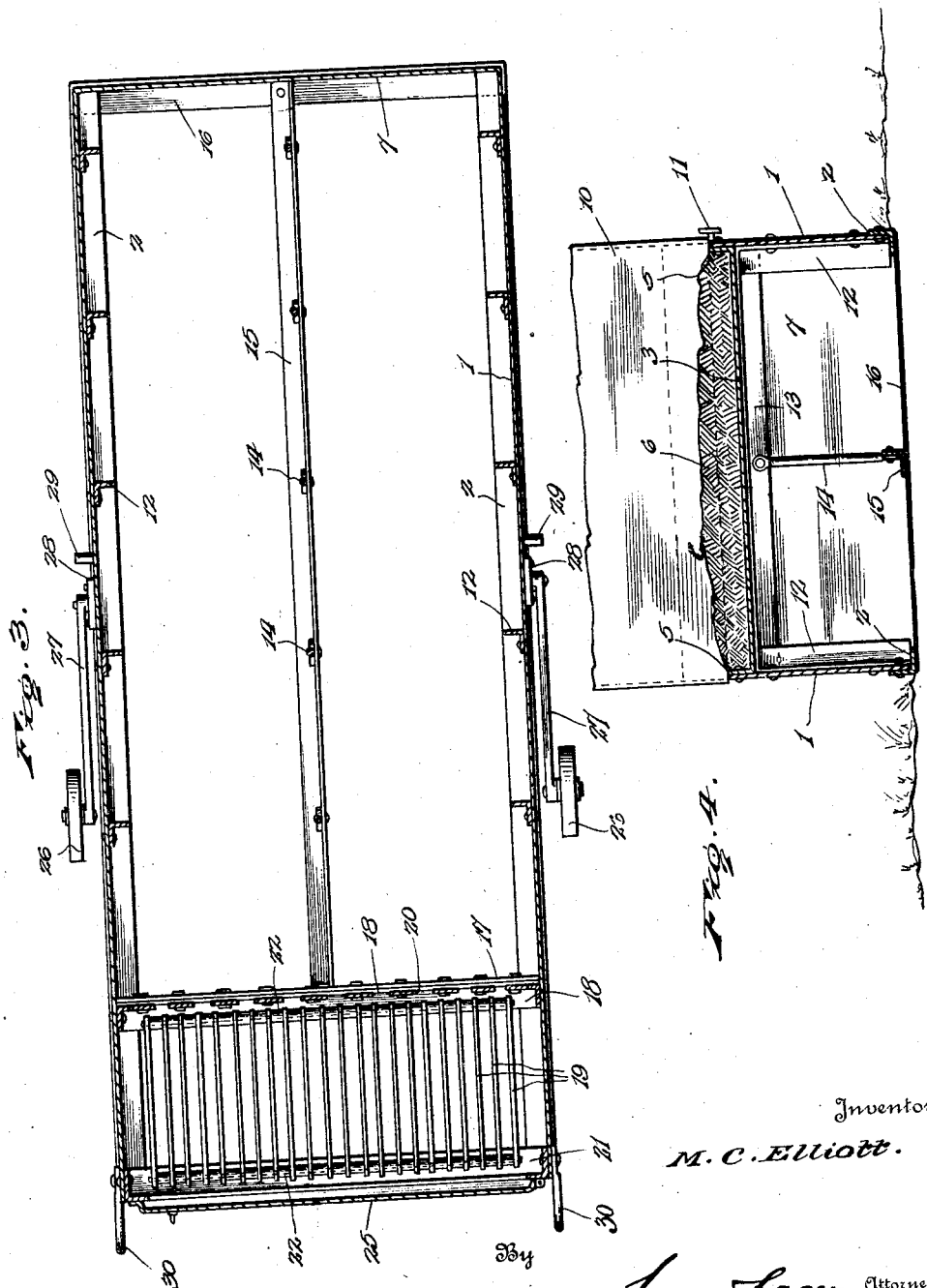

1,547,107

UNITED STATES PATENT OFFICE.

MATTHEW C. ELLIOTT, OF NASHVILLE, TENNESSEE.

WEED AND INSECT DESTROYER.

Application filed July 24, 1924. Serial No. 728,026.

*To all whom it may concern:*

Be it known that I, MATTHEW C. ELLIOTT, a citizen of the United States, residing at Nashville, in the county of Davidson and State of Tennessee, have invented certain new and useful Improvements in Weed and Insect Destroyers, of which the following is a specification.

This invention relates to means for destroying weeds, insects and other elements which may be within soil which it is desired to utilize as a bed for tobacco or other crops. The invention seeks to provide a simple, inexpensive, strong and efficient device whereby heat will be applied directly to the soil so as to destroy the seeds, weeds or insects which may be within that portion of the soil in which it is desired to plant a crop. The invention also seeks to provide a device for the stated purpose which will be so constructed that soil may be placed upon and about the same and, consequently, a large quantity of the soil treated at one operation. The invention also seeks to provide a device which may use coal as fuel and which will be of very simple construction but which will provide for regulation of draft therethrough and which may be easily moved from point to point as successive portions of the field are treated. These stated objects and other objects which will appear incidentally in the course of the following description are attained in such an apparatus as is illustrated in the accompanying drawings, and the invention resides in certain novel features which will be particularly pointed out in the appended claims.

In the drawings:

Figure 1 is a side elevation of my improved apparatus showing the same arranged to be moved to a point of use;

Fig. 2 is a central longitudinal vertical section of the apparatus;

Fig. 3 is a horizontal section on the line 3—3 of Fig. 2, and

Fig. 4 is a transverse section on the line 4—4 of Fig. 2.

My invention embodies a furnace, the body of which consists of side plates 1, preferably of sheet metal, reinforced along their lower edges by angle bars 2 which constitute supports for the side walls and prevent the same sinking into the earth to an undesirable extent. The side walls 1 are connected at their upper edges by a cover or roof 3 which, as shown most clearly in Fig. 4, has its side portions turned upwardly, as shown at 5, to constitute flanges whereby they may be very readily secured to the side walls 1. This construction also locates the main portion of the roof below the extreme upper edges of the side members and thereby furnishes a receptacle or tray in which soil may be placed, as shown at 6, to be heated through the operation of the furnace. The rear ends of the side walls are connected by a back wall 7 which may be formed integral with the side walls, as shown in Fig. 3, the upper edge of this back wall being located some distance above the extreme upper edges of the side walls, as shown at 8 in Fig. 2. The rear end portion of the roof 3 is turned upwardly, as shown at 9, in parallel relation to the upper portion of the back wall, thereby defining a short flue over which may be fitted a chimney 10. A damper 11 is provided so that the draft through the furnace may be easily regulated and dense smoke permitted to escape while at the same time, after the dense smoke has been discharged, the heat may be effectually retained within the furnace. As shown, the damper is preferably located in the flue so as to hold the heat as close to the ground as possible and in the main body of the furnace.

The side walls of the furnace are reinforced by posts 12, preferably of angle bars, secured to the side walls at intervals throughout their length, and the roof is reinforced by similar braces 13 on its under side in alinement with the said posts. Secured to the transverse braces 13 at the centers of the same are standards or props 14 which have their lower ends secured to a central longitudinal base bar 15 which is also preferably an angle bar. This base bar 15 and the props 14 serve to sustain the roof under the weight of soil placed thereon and also provide an additional means for preventing the furnace sinking into the ground to an undesirable depth. The lower edge of the back wall 7 is prevented from sinking into the ground by a reinforcing base bar 16 secured to its lower edge and corresponding to the feet or base bars 2.

The base bar 15 terminates at its front end short of the front end of the furnace, and a baffle plate 17 is disposed across the furnace in abutting relation to the front end of the said base bar. To the upper edge portion of the baffle 17 is secured an angle bar 18 which extends across the furnace and constitutes a support for the rear ends of the grate bars 19. Extending between the said angle bar 18 and the roof of the furnace are spaced bars 20 which serve as connections between the roof and the grate supporting bar 18 and also as a back for the fire-box to prevent fuel being thrown beyond the fire-box, while the spaced arrangement of these bars 20 permits the heat and products of combustion to readily flow rearwardly through the furnace. The grate bars 19 are supported at their front ends by a bar 21 similar in all respects to the bar 18 and extending across the entire front of the furnace and secured to the side walls of the same at the extreme front ends thereof. The grate bars are maintained in proper spaced relation by spacing sleeves 22 disposed between their ends and held in place by securing bars or rods 23 inserted through the spacing sleeves and the ends of the grate bars, as will be understood upon reference to Figs. 2 and 3. The grate is not secured to the supporting bars 18 and 21 but is simply rested thereon so that, if repair or renewal of the grate should be necessary, the grate may be easily removed through the front of the furnace without requiring the disassembling of any parts. The front end of the furnace is entirely open and unobstructed below the grate supporting bar 21 while the space between said bar and a like reinforcing bar 24 at the top of the furnace is normally closed by a door 25 which may be of any approved construction. When fuel is to be placed in the furnace, the door 25 is opened and the fuel placed directly upon the grate, after which the door is closed so that the draft through the furnace is necessarily through the space below the bar 21 and then up through the grate so that the inflowing air must pass through the fuel to effectually promote combustion. The baffle 17 obviously prevents the inflowing air flowing under the bottom of the furnace and, consequently, only hot air can come in contact with the earth in rear of said baffle within the area of the furnace. It will be noted that the grate is close to the ground so that the earth beneath the same will be heated and the undesirable contents thereof destroyed just as occurs under the rest of the furnace.

In order that the furnace may be readily moved from point to point, I provide the rollers or wheels 26 which are carried by the free ends of the arms 27 which are pivotally fitted upon brackets 28 secured upon the side walls of the furnace. Adjacent the brackets 28, but in rear of the vertical planes of the same, studs 29 are provided upon the side walls of the furnace and adapted to be engaged by the swinging arms 27, as shown in Fig. 1. At the front end of the furnace, handles 30 are secured to the side walls, as shown in Figs. 1 and 3. When the device is in use, the furnace rests directly upon the ground and the wheels 26 are swung forwardly, as indicated by the dotted lines in Fig. 2. When the furnace is to be moved, the front end thereof is raised by means of the handles 30 so that the wheels 26 may swing relatively downward. A slight pull on the furnace will permit the rollers to move relatively backward so that the arms 27 will swing against the stop studs 29, as shown in Fig. 1, whereupon the front end of the furnace is lowered and the furnace will be balanced, as shown in Fig. 1. It may be easily pulled then to another point of use.

In the use of the apparatus, the furnace is brought into position over a section of ground in which it is desired to plant seed. The top soil from an adjacent area is shoveled up onto the top of the furnace, as shown in Figs. 2 and 4, and the fire is then kindled upon the grate. Inasmuch as the furnace rests directly upon the ground, the only flow of air therethrough must be through the grate and then past the bars 20 longitudinally to the rear of the grate and finally out through the chimney, and some loose soil may, if desired, be heaped along the lower edges of the side walls to cut off possible flow of cold air under the walls. As my furnace permits the use of coal as a fuel, a very hot fire may be maintained, and the roof of the furnace will quickly become heated while hot-air and the products of combustion will travel rearwardly through the furnace and play directly upon the surface of the soil between the side walls of the furnace. Inasmuch as such intense heat will destroy all vegetable and animal life within the soil, the obnoxious insects, weeds and other growths will be eradicated and the soil quickly treated so that it may be easily arranged for a seed bed and the seed planted therein will quickly germinate and the ensuing crop will be free of weeds or destroying insects. Of course, after the furnace has been operated at one point for the proper period, the soil in the roof tray is returned to the area from which it was taken before moving the furnace to another point.

The apparatus is intended more particularly for use in preparing soil for tobacco beds but it may, of course, be used in preparing the beds for other crops. The apparatus is very simple, strong and durable and will be found highly efficient for the purposes for which it is designed.

Having thus described the invention, I claim:

1. An apparatus for the purpose set forth comprising a furnace having an open bottom, a grate at one end thereof, a chimney at the opposite end of the same, a roof, and a baffle at the rear end of the grate depending therefrom to the botom of the furnace, the space between the rear end of the grate and the roof being open, whereby inflowing air will be diverted through the grate and thence longitudinally of the furnace to the chimney.

2. An apparatus for the purpose stated comprising a furnace having an open bottom, side walls and a roof, base bars secured to and extending along the lower edges of the side walls, posts secured at intervals to the side walls, braces extending across the under side of the roof secured at their ends to the posts, a central longitudinal base bar, and props secured to and rising from the said base bar and secured at their upper ends to the said transverse braces.

3. An apparatus for the purpose stated comprising a furnace having side walls and a roof connecting the upper portions of the side walls, grate-supporting bars extending between the side walls, a grate resting upon the said grate-supporting bars, and spaced posts extending between the rear grate-supporting bar and the roof of the furnace.

In testimony whereof I affix my signature.

MATTHEW C. ELLIOTT. [L. S.]